United States Patent
Nam et al.

(10) Patent No.: US 9,242,548 B2
(45) Date of Patent: Jan. 26, 2016

(54) METHOD FOR CONTROLLING WATER PUMP OF VEHICLE AND SYSTEM THEREOF

(71) Applicant: Hyundai Motor Company, Seoul (KR)

(72) Inventors: Gi Young Nam, Yongin-si (KR); Seung Yong Lee, Yongin-si (KR); Minkyu Lee, Incheon (KR); Harkkoo Kim, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 62 days.

(21) Appl. No.: 14/133,313

(22) Filed: Dec. 18, 2013

(65) Prior Publication Data

US 2014/0303838 A1 Oct. 9, 2014

(30) Foreign Application Priority Data

Apr. 8, 2013 (KR) .................. 10-2013-0038057

(51) Int. Cl.
*F01P 7/04* (2006.01)
*B60K 11/02* (2006.01)
*F01P 7/16* (2006.01)
(Continued)

(52) U.S. Cl.
CPC . *B60K 11/02* (2013.01); *F01P 7/04* (2013.01); *F01P 7/048* (2013.01); *F01P 7/164* (2013.01); *F01P 5/10* (2013.01); *F01P 2005/125* (2013.01); *F01P 2025/04* (2013.01); *F01P 2025/06* (2013.01); *F01P 2025/30* (2013.01); *F01P 2025/32* (2013.01)

(58) Field of Classification Search
CPC .......... B60K 11/02; F01P 7/164; F01P 7/048; F01P 2005/046; F01P 2005/125; F01P 7/04; F01P 7/00; F01P 7/14; F01P 5/10; F01P 2025/30; F01P 2025/32; F01P 2025/04; F01P 2025/06; B60L 1/003; B60H 1/00885
USPC ............................................. 701/36
See application file for complete search history.

(56) References Cited

U.S. PATENT DOCUMENTS 4,503,814 A * 3/1985 Fujihara et al. .............. 123/41.3
6,087,028 A   7/2000 Goto
(Continued)

FOREIGN PATENT DOCUMENTS

JP    64-56528    4/1989
JP    06033760    2/1994
(Continued)

*Primary Examiner* — Jason Holloway
(74) *Attorney, Agent, or Firm* — McDermott Will & Emery LLP

(57) ABSTRACT

A method for controlling a water pump of a vehicle moving a coolant circulating through a cooling load generating heat and a radiator includes calculating a rotation speed command based on a control reference temperature of the coolant. A water pump suction pressure is set and compared with a preset control reference pressure to control the rotation speed command. A system for controlling the water pump includes a first temperature sensor for detecting a temperature of a coolant exhausted from the cooling load and a second temperature sensor for detecting a temperature of the coolant to be supplied to the cooling load. A water pump pressure sensor detects a water pump suction pressure, and a water pump driver drives the water pump. A controller controls the water pump driver based on signals received from the first temperature sensor, the second temperature sensor, and the water pump pressure sensor.

10 Claims, 13 Drawing Sheets

(51) Int. Cl.
*F01P 5/10* (2006.01)
*F01P 5/12* (2006.01)

(56) References Cited

U.S. PATENT DOCUMENTS

| | | | |
|---|---|---|---|
| 6,374,780 B1* | 4/2002 | Rutyna et al. | 123/41.12 |
| 8,561,580 B2* | 10/2013 | Kakehashi et al. | 123/41.29 |
| 2009/0269211 A1* | 10/2009 | Matsutani et al. | 417/44.1 |
| 2010/0083916 A1* | 4/2010 | Shintani et al. | 123/41.1 |
| 2010/0155036 A1* | 6/2010 | Andris et al. | 165/104.31 |
| 2011/0259287 A1* | 10/2011 | Kakehashi et al. | 123/41.09 |
| 2012/0210954 A1* | 8/2012 | Nishikawa et al. | 123/41.08 |

FOREIGN PATENT DOCUMENTS

| | | |
|---|---|---|
| JP | 2004-019590 A | 1/2004 |
| JP | 2004-144042 A | 5/2004 |
| JP | 2008-185021 A | 8/2008 |
| KR | 10-0317347 | 12/2001 |

* cited by examiner

METHOD FOR CONTROLLING WATER PUMP OF VEHICLE AND SYSTEM THEREOF

CROSS-REFERENCE TO RELATED APPLICATION

This application claims the benefit of priority to Korean Patent Application No. 10-2013-0038057 filed in the Korean Intellectual Property Office on Apr. 8, 2013, the entire contents of which are incorporated herein by reference.

TECHNICAL FIELD

The present disclosure relates to a method for controlling a water pump of a vehicle and a system thereof. More particularly, the present disclosure relates to a method for controlling a water pump of a vehicle for reducing a rotation speed command when a water pump suction pressure is less than a control reference pressure and a system thereof.

BACKGROUND

In general, a cooling system of a vehicle controls rotation speed of a water pump based on a coolant temperature. The cooling system of the vehicle circulates the coolant circulating through a cooling load generating heat and a radiator discharging the heat to the outside via the water pump.

When driving the vehicle at a high altitude, as the atmospheric pressure is reduced, the water pump suction pressure is reduced. When the water pump suction pressure is reduced, as the water pump rotation speed is increased, the probability of cavitation is increased. The cavitation signifies a phenomenon in which the coolant is vaporized in an impeller of the water pump.

The probability of the cavitation is increased by increasing the water pump rotation speed, a flow rate of the coolant, and a water pump suction temperature, and reducing the water pump suction pressure and a saturation vapor pressure. If the atmospheric pressure is reduced, since the water pump suction pressure is reduced, the probability of the cavitation is increased.

Particularly, when comparing a fuel cell vehicle with a vehicle including an engine, there is a need for the increase in the coolant flow rate. However, an air-tightness level is low so that a pressure range capable of pressurizing is reduced, thus limiting the flow rate of the coolant to design a stable cooling system against a pressure variation of external air. Accordingly, there is a demand for a method of preventing the cavitation from being generated due to the variation in atmospheric pressure.

The above information disclosed in this Background section is only for enhancement of understanding of the background of the disclosure, and therefore it may contain information that does not form the prior art that is already known in this country to a person of ordinary skill in the art.

SUMMARY

The present disclosure has been made in an effort to provide a method for controlling a water pump of a vehicle and a system thereof having advantages of preventing cavitation from being generated by reducing a rotation speed command when a water pump suction pressure is less than a control reference pressure.

An exemplary embodiment of the present disclosure provides a method for controlling a water pump of a vehicle moving a coolant circulating through a cooling load generating heat and a radiator discharging the heat to an outside. The method includes calculating a rotation speed command based on a control reference temperature of the coolant. A water pump suction pressure is set and compared with a preset control reference pressure to control the rotation speed command.

The comparing the water pump suction pressure with the preset control reference pressure may include reducing the rotation speed command if the water pump suction pressure is less than the preset control reference pressure.

The method may further include detecting a pressure sensing value, and the water pump suction pressure may be set as the detected pressure sensing value.

The method may further include setting an atmospheric pressure and calculating a reference altitude based on the set atmospheric pressure. The water pump suction pressure may be set from a map with respect to the water pump suction pressure according to the rotation speed command in the calculated reference altitude.

The setting the atmospheric pressure may include detecting an atmospheric pressure sensing value, wherein the atmospheric pressure may be set as the detected atmospheric pressure sensing value.

The setting the atmospheric pressure may further include detecting an air pressure and an air flow rate supplied from an air supplier. The atmospheric pressure is calculated based on the detected air pressure and air flow rate, and the atmospheric pressure may be set as the calculated atmospheric pressure.

The method may further include setting a water pump suction temperature and calculating a saturation vapor pressure in a suction side of the water pump based on the water pump suction temperature. The control reference pressure may be set according to the calculated saturation vapor pressure in the suction side of the water pump.

The method may further include detecting a water pump suction temperature sensing value, and the water pump suction temperature may be set as the detected water pump suction temperature sensing value.

The method may further include detecting a temperature sensing value difference between an input terminal and an output terminal of the cooling load, and the control reference temperature may be set as the detected temperature sensing value difference.

Another embodiment of the present disclosure provides a system for controlling a water pump of a vehicle moving a coolant circulating through a cooling load generating heat and a radiator discharging the heat to an outside. The system includes a first temperature sensor for detecting a temperature of the coolant exhausted from the cooling load, and a second temperature sensor for detecting a temperature of the coolant to be supplied to the cooling load. A water pump pressure sensor detects a water pump suction pressure, and a water pump driver drives the water pump according to a rotation speed command. A controller controls the water pump driver based on signals received from the first temperature sensor, the second temperature sensor, and the water pump pressure sensor. Wherein, the controller calculates the rotation speed command from a temperature difference between an input terminal and an output terminal of the cooling load, and reduces the rotation speed command when the water pump suction pressure is less than a preset control reference pressure.

Another embodiment of the present disclosure provides a system for controlling a water pump of a vehicle moving a coolant circulating through a cooling load generating heat and a radiator discharging the heat to an outside. The system includes a first temperature sensor for detecting a temperature of a coolant exhausted from the cooling load, and a second temperature sensor for detecting a temperature of the coolant to be supplied to the cooling load. An atmospheric pressure sensor detects atmospheric pressure, and a water pump driver drives according to a rotation speed command. A controller controls the water pump driver based on signals received from the first temperature sensor, the second temperature sensor, and the atmospheric pressure sensor. Wherein, the controller calculates the rotation speed command from a temperature difference between an input terminal and an output terminal of the cooling load, calculates a reference altitude based on the atmospheric pressure, sets a water pump suction pressure from a map with respect to the water pump suction pressure according to the rotation speed command in the reference altitude, and reduces the rotation speed command when the water pump suction pressure is less than a preset control reference pressure.

Another embodiment of the present disclosure provides a system for controlling a water pump of a vehicle moving a coolant circulating through a cooling load generating heat and a radiator discharging the heat to an outside. The system includes a first temperature sensor for detecting a temperature of a coolant exhausted from the cooling load, and a second temperature sensor for detecting a temperature of the coolant to be supplied to the cooling load. An air supplier pressure sensor detects an air pressure supplied from the air supplier, and an air supplier flow rate sensor detects a flow rate of air supplied from the air supplier. A water pump driver drives the water pump according to a rotation speed command. A controller controls the water pump driver based on signals received from the first temperature sensor, the second temperature sensor, the air supplier pressure sensor, and the air supplier flow rate sensor. Wherein, the controller calculates the rotation speed command from a temperature difference between an input terminal and an output terminal of the cooling load, calculates an atmospheric pressure based on the air pressure and the flow rate of the air, and calculates a reference altitude based on the atmospheric pressure. The controller further sets a water pump suction pressure from a map with respect to the water pump suction pressure according to the rotation speed command in the reference altitude and reduces the rotation speed command when the water pump suction pressure is less than a preset control reference pressure.

The system may further include a water pump temperature sensor for detecting a water pump suction temperature.

DETAILED DESCRIPTION OF THE EMBODIMENTS

Hereinafter, the present disclosure will be described more fully hereinafter with reference to the accompanying drawings, in which exemplary embodiments of the disclosure are shown. However, the present disclosure may be modified in various different ways, not limited to exemplary embodiments described herein.

In addition, in the following specification, unless explicitly described to the contrary, the word "comprise" and variations such as "comprises" or "comprising" will be understood to imply the inclusion of stated elements but not the exclusion of any other elements.

Figure 1:
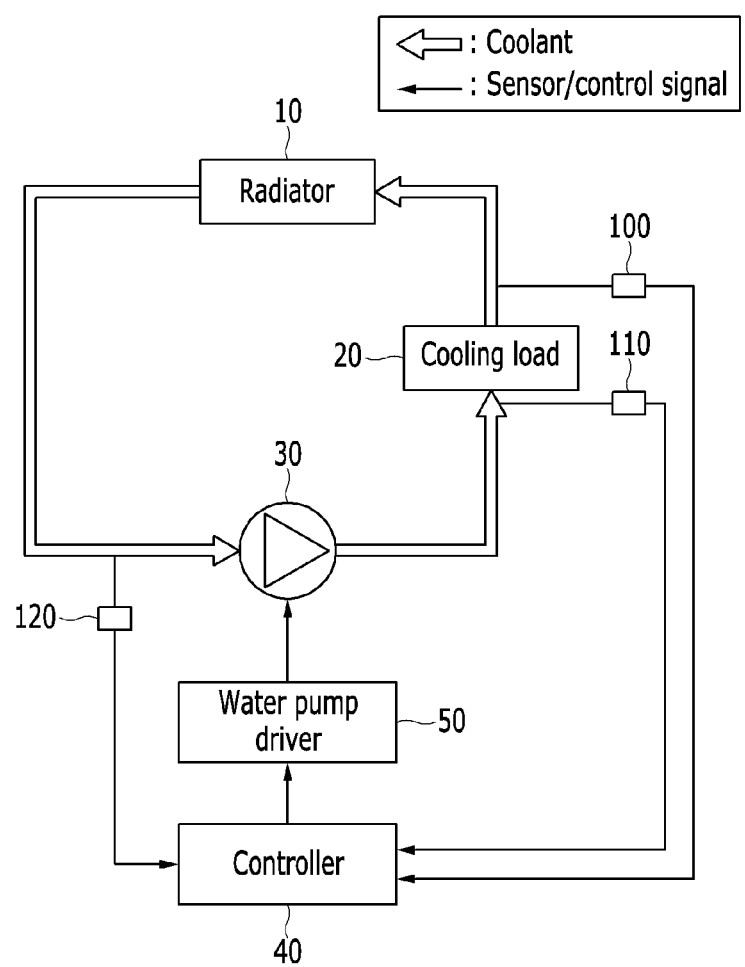
FIG. 1 is a block diagram illustrating a water pump system of a vehicle according to an exemplary embodiment of the present disclosure.

FIG. 1 is a block diagram illustrating a water pump system of a vehicle according to an exemplary embodiment of the present disclosure.

Referring to FIG. 1, a water pump system of a vehicle according to an exemplary embodiment of the present disclosure includes a radiator 10, a cooling load 20, a water pump 30, a controller 40, a water pump driver 50, a first temperature sensor 100, a second temperature sensor 110, and a water pump pressure sensor 120.

The radiator 10 discharges heat generated from the cooling load 20 to the outside. The water pump 30 moves a coolant circulating through the radiator 10 and the cooling load 20.

The controller 40 controls the water pump system of a vehicle according to an exemplary embodiment of the present disclosure. The controller 40 may be implemented by at least one microprocessor operated by predetermined program, and the predetermined program may include a series of command for performing respective steps included in the method for controlling the water pump of a vehicle according to an exemplary embodiment of the present disclosure to be described later. The water pump driver 50 receives a control signal from the controller 40 and drives the water pump 30.

The first temperature sensor 100 detects a temperature of the coolant exhausted from the cooling load 20 and transfers the detected temperature of the coolant to the controller 40. The second temperature sensor 110 detects the temperature of the coolant to be supplied to the cooling load 20 and transfers the detected temperature of the coolant to the controller 40.

The water pump pressure sensor 120 detects coolant pressure of a suction side of the water pump 30 and transfers the detected coolant pressure of the suction side of the water pump 30 to the controller 40. Here, the water pump suction pressure P_suc refers to a coolant pressure of the suction side of the water pump 30.

The controller 40 controls the water pump driver 50 based on signals received from the first temperature sensor 100, the second temperature sensor 110, and the water pump pressure sensor 120 to control a rotation speed of the water pump 30.

Figure 12:
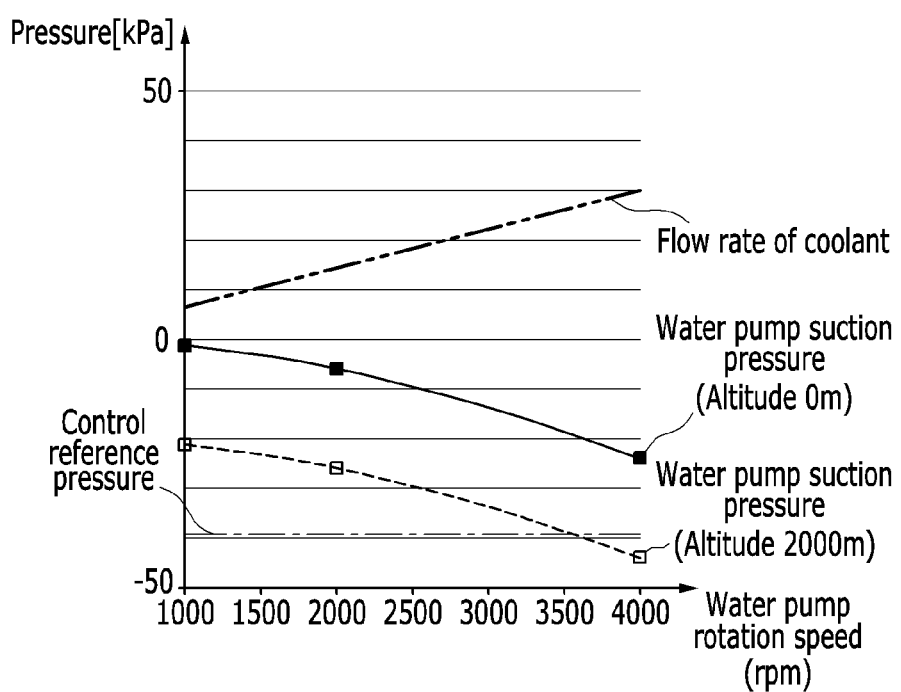
FIGS. 12 and 13 are graphs illustrating a water pump suction pressure variation according to a water pump rotation speed of a vehicle according to an exemplary embodiment of the present disclosure.

FIG. 12 is a graph illustrating a variation in a water pump suction pressure according to a water pump rotation speed of a vehicle according to an exemplary embodiment of the present disclosure.

Referring to FIG. 12, if the water pump rotation speed is increased, a flow rate of a coolant is increased and the water pump suction pressure P_suc is reduced. Here, a control reference pressure P_suc_ref refers to a preset water pump pressure capable of generating cavitation.

For example, if water pump rotation speed is greater than 3500 rpm in altitude of 2000 m, the water pump suction pressure P_suc is less than the control reference pressure P_suc_ref so that the cavitation may be generated. Accordingly, there is a need to control the water pump suction pressure P_suc to be equal to or greater than the control reference pressure P_suc_ref by reducing the water pump rotation speed. In this case, the flow rate of the coolant is reduced. In hilly areas, ambient temperature is low so that cooling performance may be compensated.

Hereinafter, a method for controlling a water pump of a vehicle according to an exemplary embodiment of the present disclosure will be described in detail with reference to FIGS. 7 and 8.

Figure 7:
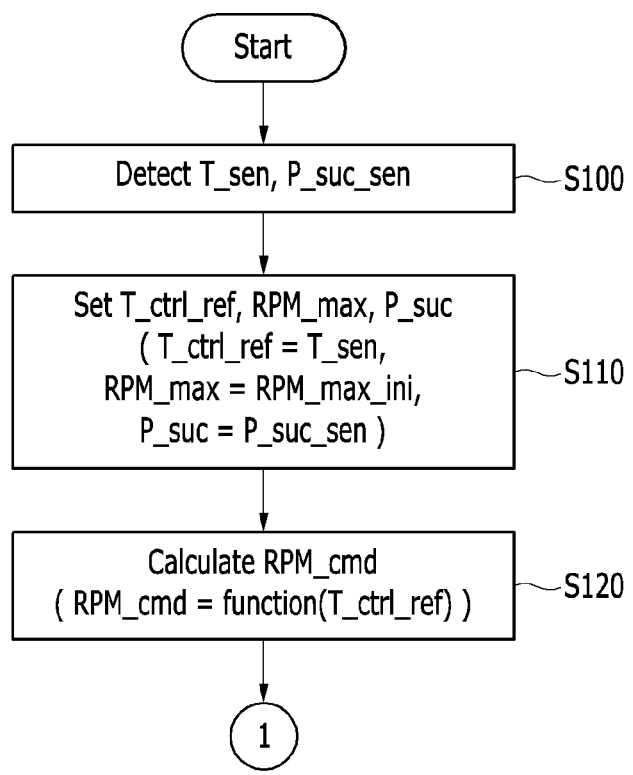
FIG. 7 is a flowchart illustrating a method for controlling a water pump of a vehicle according to an exemplary embodiment of the present disclosure.

FIG. 7 is a flowchart illustrating a method for controlling a water pump of a vehicle according to an exemplary embodiment of the present disclosure. FIG. 8 is a flowchart illustrating a procedure of controlling a rotation speed command by comparing a water pump suction pressure with a control reference pressure according to an exemplary embodiment of the present disclosure.

Referring to FIG. 7, a temperature sensing value difference T_sen between an input terminal and an output terminal of the cooling load and a pressure sensing value P_suc_sen are detected (S100). Here, the temperature sensing value difference T_sen refers to a difference between a temperature sensing value of the coolant supplied to the cooling load and a temperature sensing value of the coolant exhausted from the cooling load.

The controller 40 sets a control reference temperature T_ctrl_ref, a maximum rotation speed RPM_max, and a water pump suction pressure P_suc (S110). The control reference temperature T_ctrl_ref is a variable for determining water pump rotation speed. Although the control reference temperature T_ctrl_ref is set as the detected temperature sensing value difference T_sen, the present disclosure is not limited thereto. That is, the control reference temperature T_ctrl_ref may be set as another reference value.

The controller 40 sets the maximum rotation speed RPM_max as an initial preset value RPM_max_ini and sets a water pump suction pressure P_suc as the detected pressure sensing value P_suc_sen. The controller 40 then calculates a rotation speed command RPM_cmd (S120). The rotation speed of the water pump 30 is determined according to the rotation speed command RPM_cmd. The rotation speed command RPM_cmd is calculated as a function with respect to the control reference temperature T_ctrl_ref.

Figure 8:
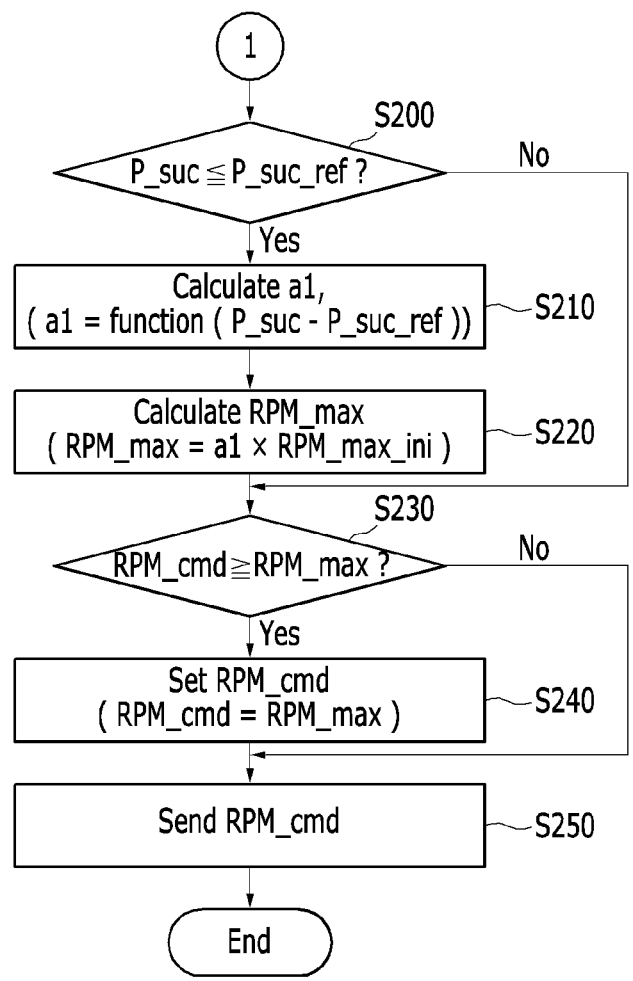
FIG. 8 is a flowchart illustrating a procedure of controlling a rotation speed command by comparing a water pump suction pressure with a control reference pressure according to an exemplary embodiment of the present disclosure.

Referring to FIG. 8, the controller 40 compares the water pump suction pressure P_suc with the control reference pressure P_suc_ref (S200). When the water pump suction pressure P_suc is greater than the control reference pressure P_suc_ref, the controller 40 compares the rotation speed command RPM_cmd with the maximum rotation speed RPM_max (S230).

In this case, when the rotation speed command RPM_cmd is less than the maximum rotation speed RPM_max, the controller 40 sends the rotation speed command RPM_cmd to the water pump driver 50 (S250). When the rotation speed command RPM_cmd is greater than the maximum rotation speed RPM_max, the controller 40 sets the rotation speed command RPM_cmd as the maximum rotation speed RPM_max (S240), and sends the rotation speed command (RPM_cmd) to the water pump driver 50 (S250).

When the water pump suction pressure P_suc is less than the control reference pressure P_suc_ref, the controller 40 calculates a correction coefficient a1 (S210). The correction coefficient a1 is in the range of 0 to 1 and calculated as a function with respect to a difference between the water pump suction pressure P_suc and the control reference pressure P_suc_ref. After that, the controller 40 multiplies the correction coefficient a1 by the initial preset value RPM_max_ini to calculate the maximum rotation speed RPM_max (S220). Then, the controller 40 compares the calculated maximum rotation speed RPM_max with the rotation speed command RPM_cmd (S230).

When the rotation speed command RPM_cmd is less than the calculated maximum rotation speed RPM_max, the controller 40 sends the rotation speed command RPM_cmd to the water pump driver 50 (S250). When the rotation speed command RPM_cmd is greater than the calculated maximum rotation speed RPM_max, the controller 40 sets the rotation speed command RPM_cmd as the calculated maximum rotation speed RPM_max (S240) and sends the rotation speed command RPM_cmd to the water pump driver 50 (S250).

Accordingly, when the water pump suction pressure P_suc is less than the control reference pressure P_suc_ref, the controller 40 may increase the water pump suction pressure P_suc to be greater than the control reference pressure P_suc_ref by reducing the rotation speed command RPM_cmd.

Figure 2:
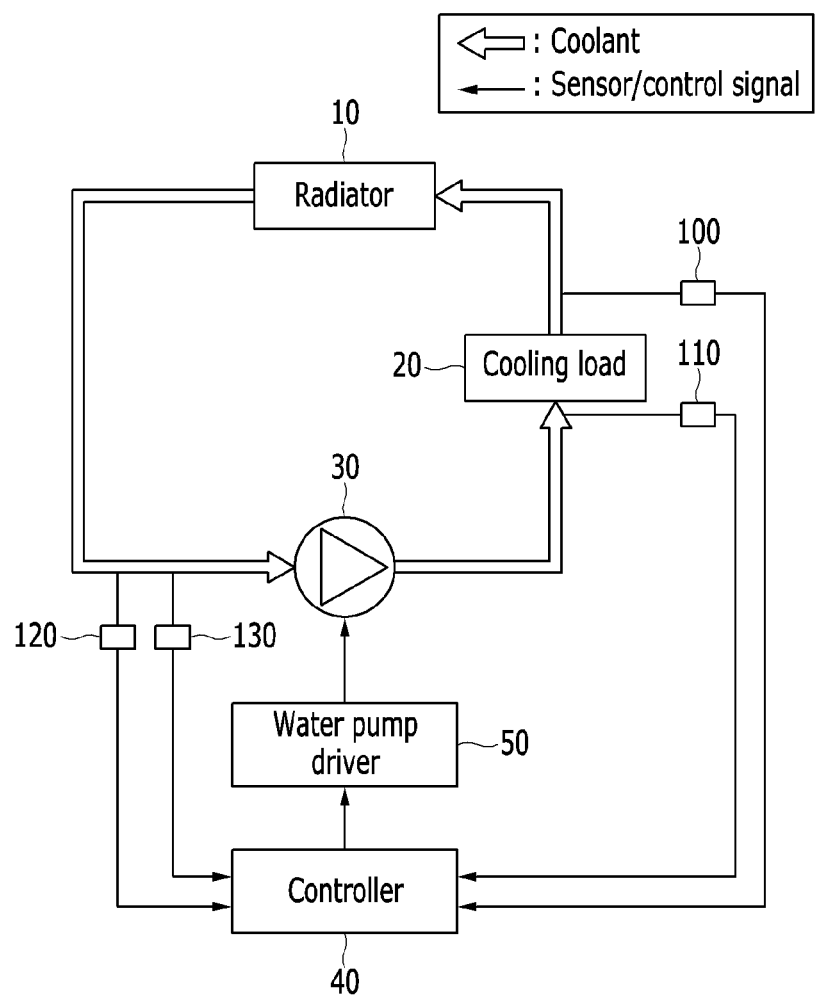
FIG. 2 is a block diagram illustrating a water pump system of a vehicle according to another exemplary embodiment of the present disclosure.
Figure 9:
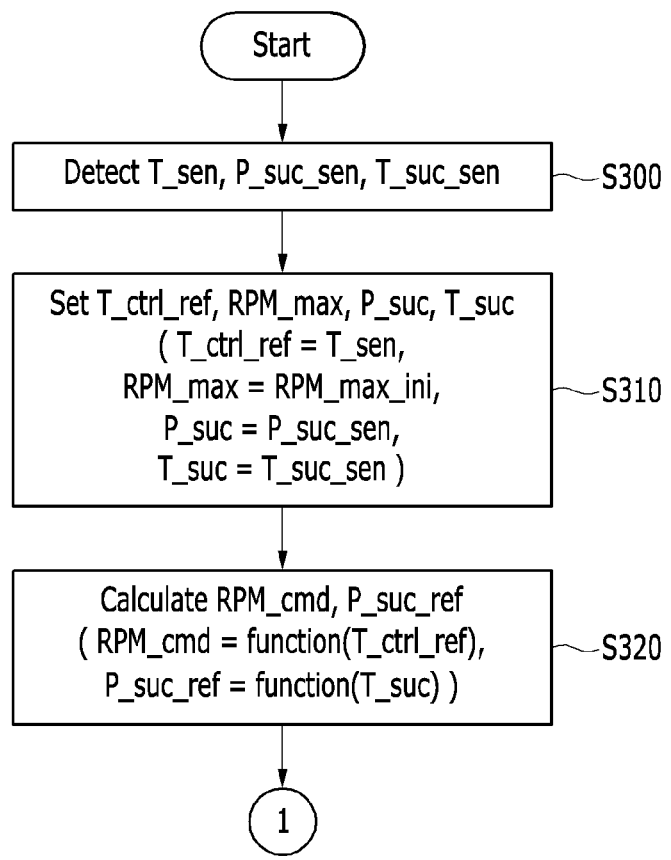
FIG. 9 is a flowchart illustrating a method for controlling a water pump of a vehicle according to another exemplary embodiment of the present disclosure.

FIG. 2 is a block diagram illustrating a water pump system of a vehicle according to another exemplary embodiment of the present disclosure. FIG. 9 is a flowchart illustrating a method for controlling a water pump of a vehicle according to another exemplary embodiment of the present disclosure.

The same reference numerals will be used to refer to the same constituent elements throughout the exemplary embodiment and detailed description about the same elements will be omitted in order to avoid redundancy.

Referring to FIG. 2, a water pump system of a vehicle according to another exemplary embodiment of the present disclosure includes a radiator 10, a cooling load 20, a water pump 30, a controller 40, a water pump driver 50, a first temperature sensor 100, a second temperature sensor 110, a water pump pressure sensor 120, and a water pump temperature sensor 130.

The water pump temperature sensor 130 detects a coolant temperature of a suction side of the water pump 30 and sends the detected coolant temperature to the controller 40. The water pump suction temperature T_suc refers to the coolant temperature of the water pump 30.

The controller 40 controls the water pump driver 50 to drive the water pump 30 based on signals received from the first temperature sensor 100, the second temperature sensor 110, the water pump pressure sensor 120, and the water pump temperature sensor 130.

Figure 13:
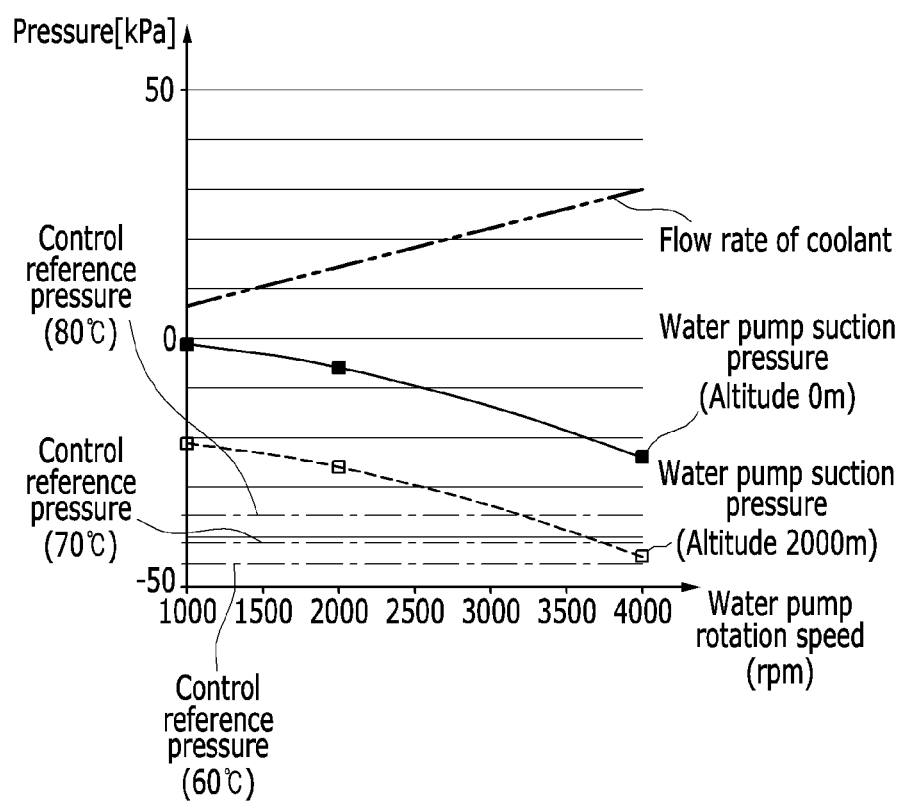

FIG. 13 is a graph illustrating a variation in the water pump suction pressure according to a water pump rotation speed of a vehicle according to an exemplary embodiment of the present disclosure. Referring to FIG. 13, a different control reference pressure P_suc_ref may be set according to the water pump suction temperature T_suc. A saturation vapor pressure of the water pump suction side is calculated based on the water pump suction temperature T_suc to set the control reference pressure P_suc_ref.

Referring to FIG. 9, a temperature sensing value difference T_sen, a pressure sensing value P_suc_sen, and a temperature sensing value T_suc_sen are detected (S300). The controller 40 sets a reference control temperature T_ctrl_ref, a maximum rotation speed RPM_max, a water pump suction pressure P_suc, and a water pump suction temperature T_suc (S310). The controller 40 sets the water pump suction temperature T_suc as the detected temperature sensing value T_suc_sen.

The controller 40 then calculates the rotation speed command RPM_cmd and a control reference pressure P_suc_ref (S320). The control reference pressure P_suc_ref is calculated as a function with respect to the water pump suction temperature T_suc. The saturation vapor pressure of the water pump suction side is calculated based on the water pump suction temperature T_suc, and a control reference pressure P_suc_ref is set. Then, the controller 40 performs the foregoing steps S200 to S250.

Figure 3:
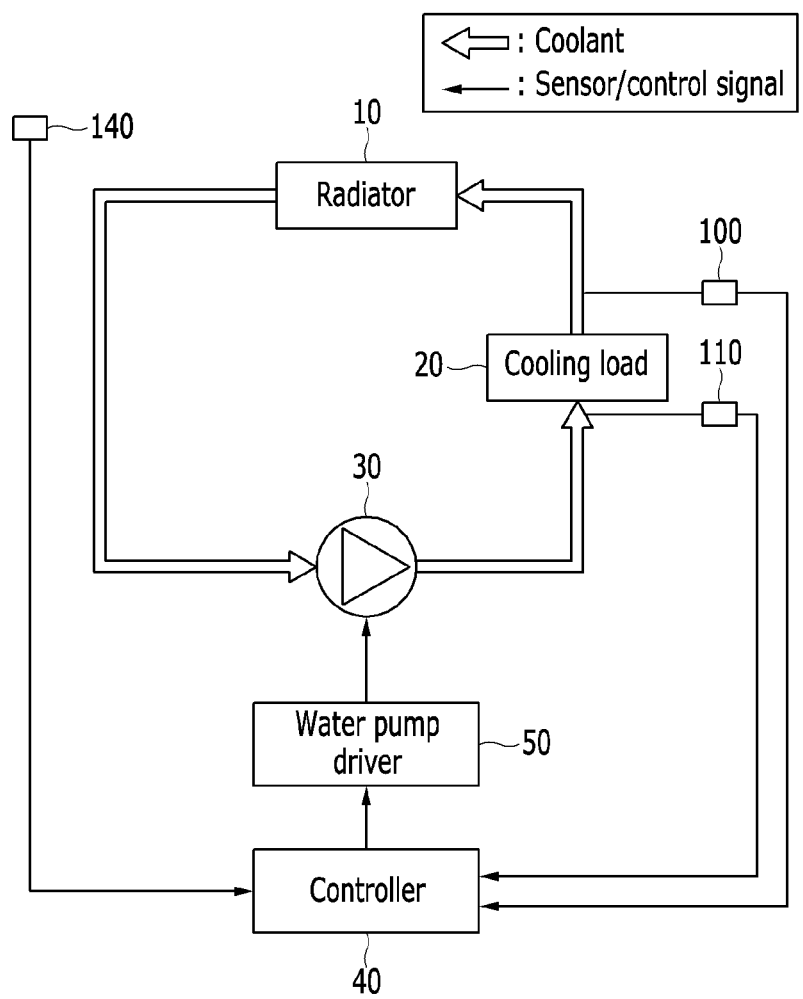
FIG. 3 is a block diagram illustrating a water pump system of a vehicle according to another exemplary embodiment of the present disclosure.
Figure 10:
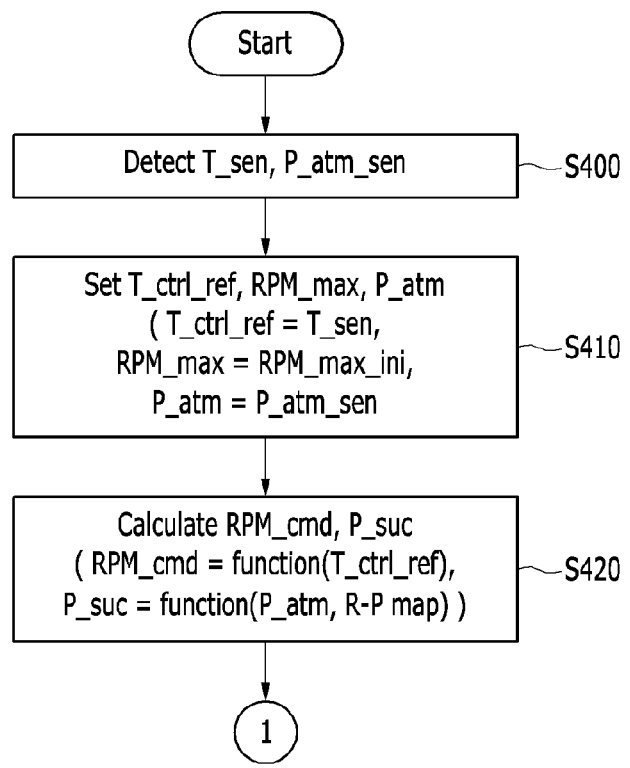
FIG. 10 is a flowchart illustrating a method for controlling a water pump of a vehicle according to another exemplary embodiment of the present disclosure.

FIG. 3 is a block diagram illustrating a water pump system of a vehicle according to another exemplary embodiment of the present disclosure. FIG. 10 is a flowchart illustrating a method for controlling a water pump of a vehicle according to another exemplary embodiment of the present disclosure.

The same reference numerals will be used to refer to the same constituent elements throughout the exemplary embodiment and detailed description about the same elements will be omitted in order to avoid redundancy.

Referring to FIG. 3, a water pump system of a vehicle according to another exemplary embodiment of the present disclosure includes a radiator 10, a cooling load 20, a water pump 30, a controller 40, a water pump driver 50, a first temperature sensor 100, a second temperature sensor 110, and an atmospheric pressure sensor 140.

The atmospheric pressure sensor 140 is a sensor to measure the atmospheric pressure, and detects and sends an atmospheric pressure sensing value P_atm_sen to the controller 40. The controller 40 further controls the water pump driver 50 to drive the water pump 30 based on signals received from the first temperature sensor 100, the second temperature sensor 110, the water pump pressure sensor 120, and the atmospheric pressure sensor 140.

Referring to FIG. 10, the controller 40 may calculate a reference altitude based on the atmospheric pressure P_atm to set an expected water pump suction pressure P_suc.

A temperature sensing value difference T_sen and the atmospheric pressure sensing value P_atm_sen are detected (S400). The controller 40 sets a control reference temperature T_ctrl_ref, a maximum rotation speed RPM_max, and the atmospheric pressure P_atm (S410). The controller 40 sets the atmospheric pressure P_atm as the detected atmospheric pressure sensing value P_atm_sen.

Next, the controller 40 calculates a speed command RPM_cmd and a water pump suction pressure P_suc (S420). A reference altitude is calculated based on the atmospheric pressure P_atm, and the water pump suction side pressure P_suc is set from an R-P map with respect to water pump suction pressure according to the rotation speed command RPM_cmd in the calculated reference altitude. That is, an expected water pump suction pressure P_suc is stored according to the rotation speed command RPM_cmd for each reference altitude. The controller 40 then performs the foregoing steps S200 to S250.

Figure 4:
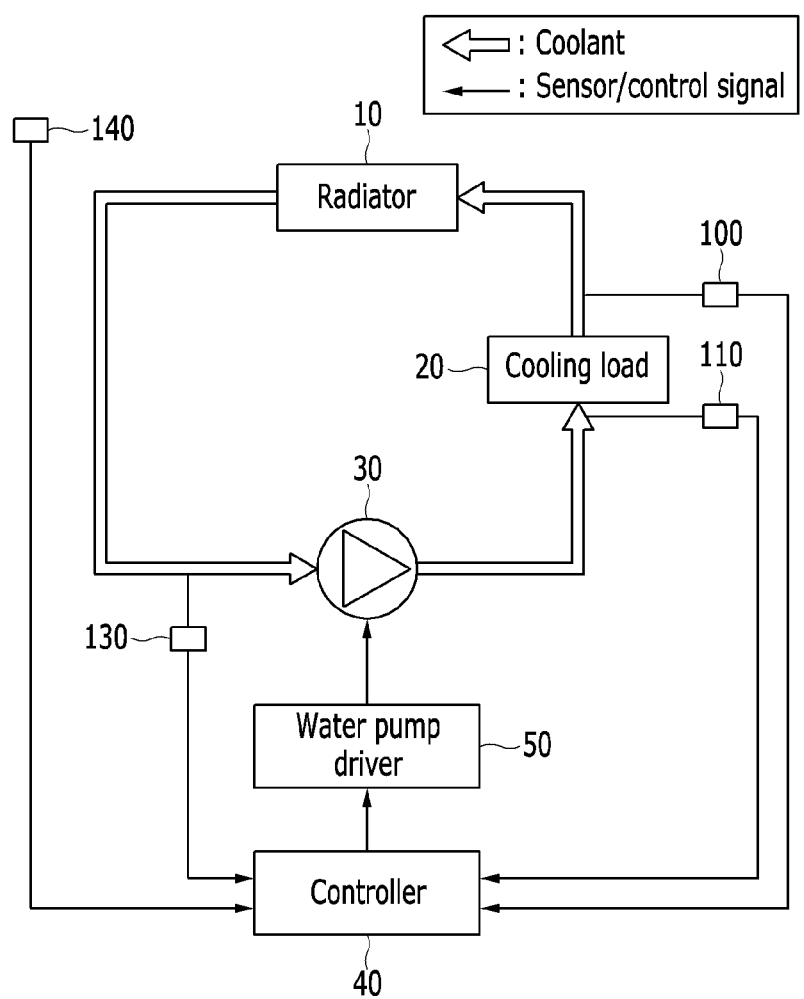
FIG. 4 is a block diagram illustrating a water pump system of a vehicle according to another exemplary embodiment of the present disclosure.

FIG. 4 is a block diagram illustrating a water pump system of a vehicle according to another embodiment of the present disclosure.

The same reference numerals will be used to refer to the same constituent elements throughout the exemplary embodiment and detailed description about the same elements will be omitted in order to avoid redundancy.

Referring to FIG. 4, a water pump system of a vehicle of another exemplary embodiment of the present disclosure includes a radiator 10, a cooling load 20, a water pump 30, a controller 40, a water pump driver 50, a first temperature sensor 100, a second temperature sensor 110, a water pump temperature sensor 130, and an atmospheric pressure sensor 140.

Further, the controller 40 controls the water pump driver 50 to drive the water pump 30 based on signals received from the first temperature sensor 100, the second temperature sensor 110, the water pump temperature sensor 130, and the atmospheric pressure sensor 140.

Figure 5:
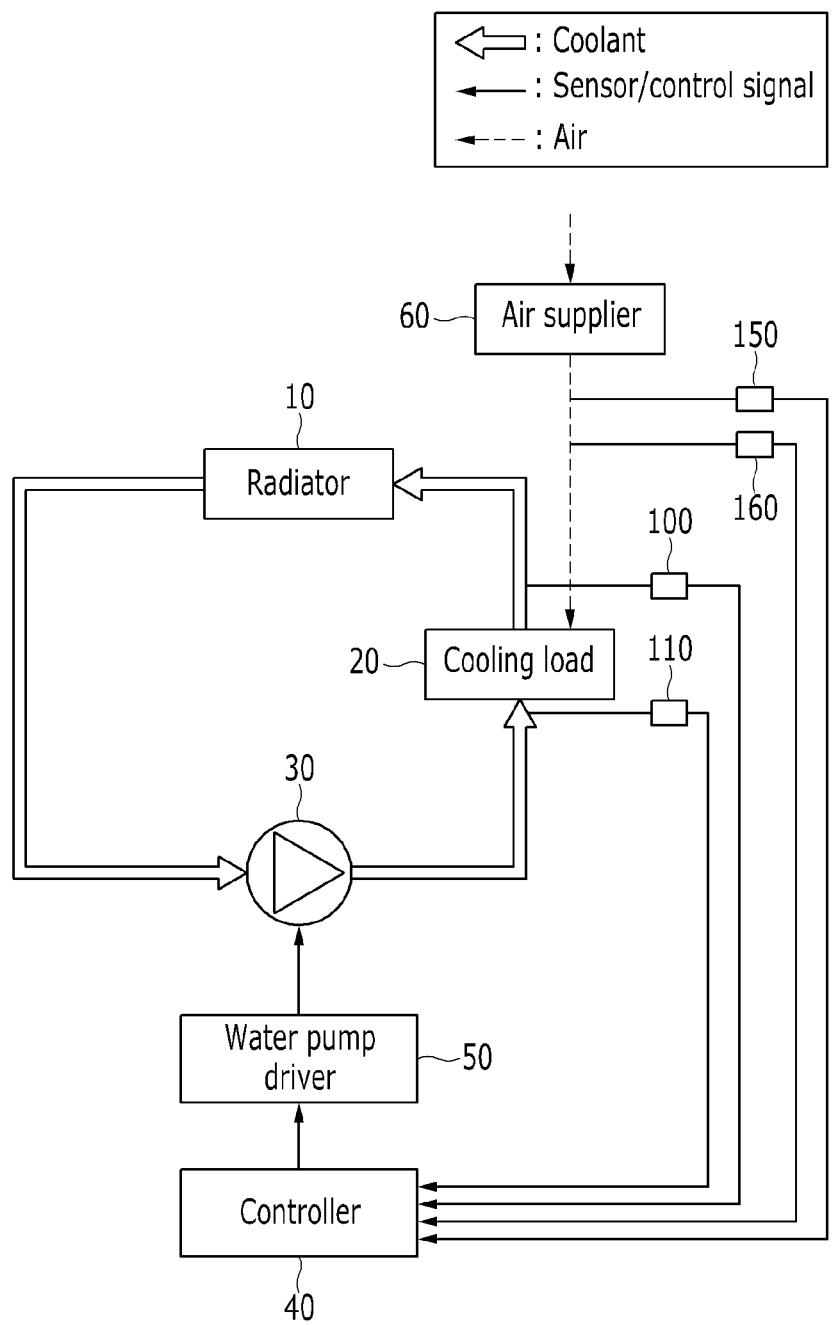
FIG. 5 is a block diagram illustrating a water pump system of a vehicle according to another exemplary embodiment of the present disclosure.
Figure 11:
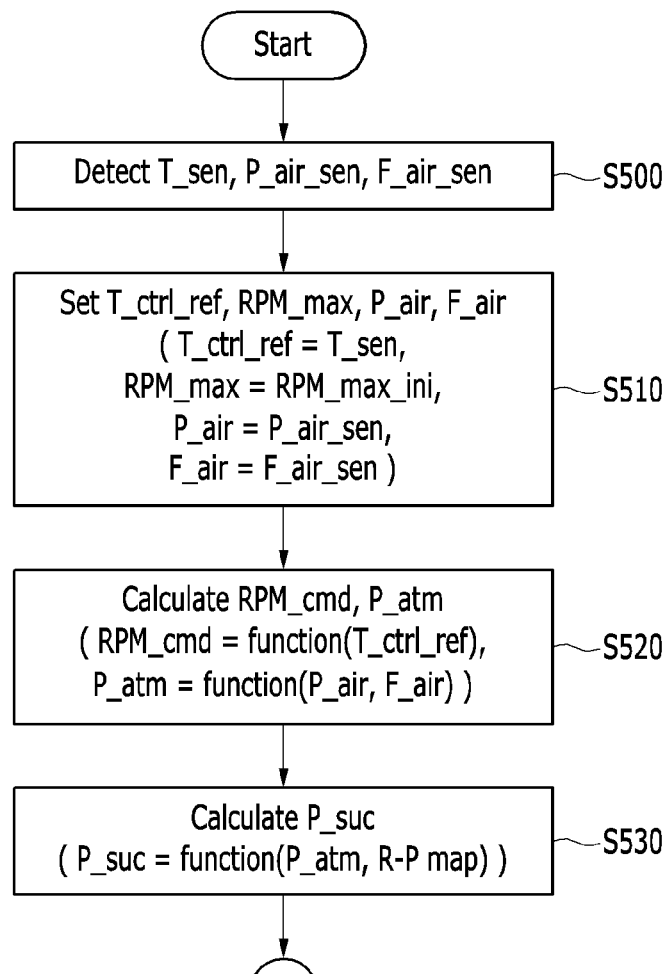
FIG. 11 is a flowchart illustrating a method for controlling a water pump of a vehicle according to another exemplary embodiment of the present disclosure.

FIG. 5 is a block diagram illustrating a water pump system of a vehicle according to another exemplary embodiment of the present disclosure. FIG. 11 is a flowchart illustrating a method for controlling a water pump of a vehicle according to another exemplary embodiment of the present disclosure.

The same reference numerals will be used to refer to the same constituent elements throughout the exemplary embodiment and detailed description about the same elements will be omitted in order to avoid redundancy.

Referring to FIG. 5, a water pump system of a vehicle according to another exemplary embodiment of the present disclosure includes a radiator 10, a cooling load 20, a water pump 30, a controller 40, a water pump driver 50, an air supplier 60, a first temperature sensor 100, a second temperature sensor 110, an air supplier pressure sensor 150, and an air supplier flow rate sensor 160.

The air supplier 60 supplies external air to the cooling load 20. The air supplier pressure sensor 150 is a sensor to measure air pressure supplied from the air supplier 60, which detects and sends an air pressure sensing value P_air_sen to the controller 40.

The air supplier flow rate sensor 160 is a sensor to measure a flow rate of air supplied from the air supplier 60, which detects and sends an air flow rate sensing value F_air_sen to the controller 40. In addition, the controller 40 controls the water pump driver 50 to drive the water pump 30 based on signals received from the first temperature sensor 100, the second temperature sensor 110, the air supplier pressure sensor 150, and the air supplier flow rate sensor 160.

Referring to FIG. 11, the controller 40 may calculate an expected atmospheric pressure based on an air pressure P_air and an air flow rate F_air supplied from the air supplier 60. The controller 40 may calculate a reference altitude based on the calculated atmospheric pressure P_atm to set an expected water pump suction pressure P_suc.

A temperature sensing value difference T_sen, an air pressure sensing value P_air_sen, and an air flow rate sensing value F_air_sen are detected (S500). The controller 40 sets a control reference temperature T_ctrl_ref, a maximum rotation speed RPM_max, an air pressure P_air, and an air flow rate F_air (S510). The controller 40 sets the air pressure P_air as the detected air pressure sensing value P_air_sen. The controller 40 then sets the air flow rate F_air as the detected air flow rate sensing value F_air_sen.

Then, the controller 40 calculates a rotation speed command RPM_cmd and an atmospheric pressure P_atm (S520). The atmospheric pressure P_atm is calculated as a function with respect to the air pressure P_air and the air flow rate F_air. The controller 40 calculates a water pump suction pressure P_suc (S530).

A reference altitude is calculated based on the calculated atmospheric pressure P_atm, the water pump suction pressure P_suc is set from a map (R-P map) with respect to the water pump suction pressure according to the rotation speed command RPM_cmd in the calculated reference altitude. That is, an expected water pump suction pressure P_suc is stored according to the rotation speed command RPM_cmd for each reference altitude. Then, the controller 40 performs the foregoing steps S200 to S250.

Figure 6:
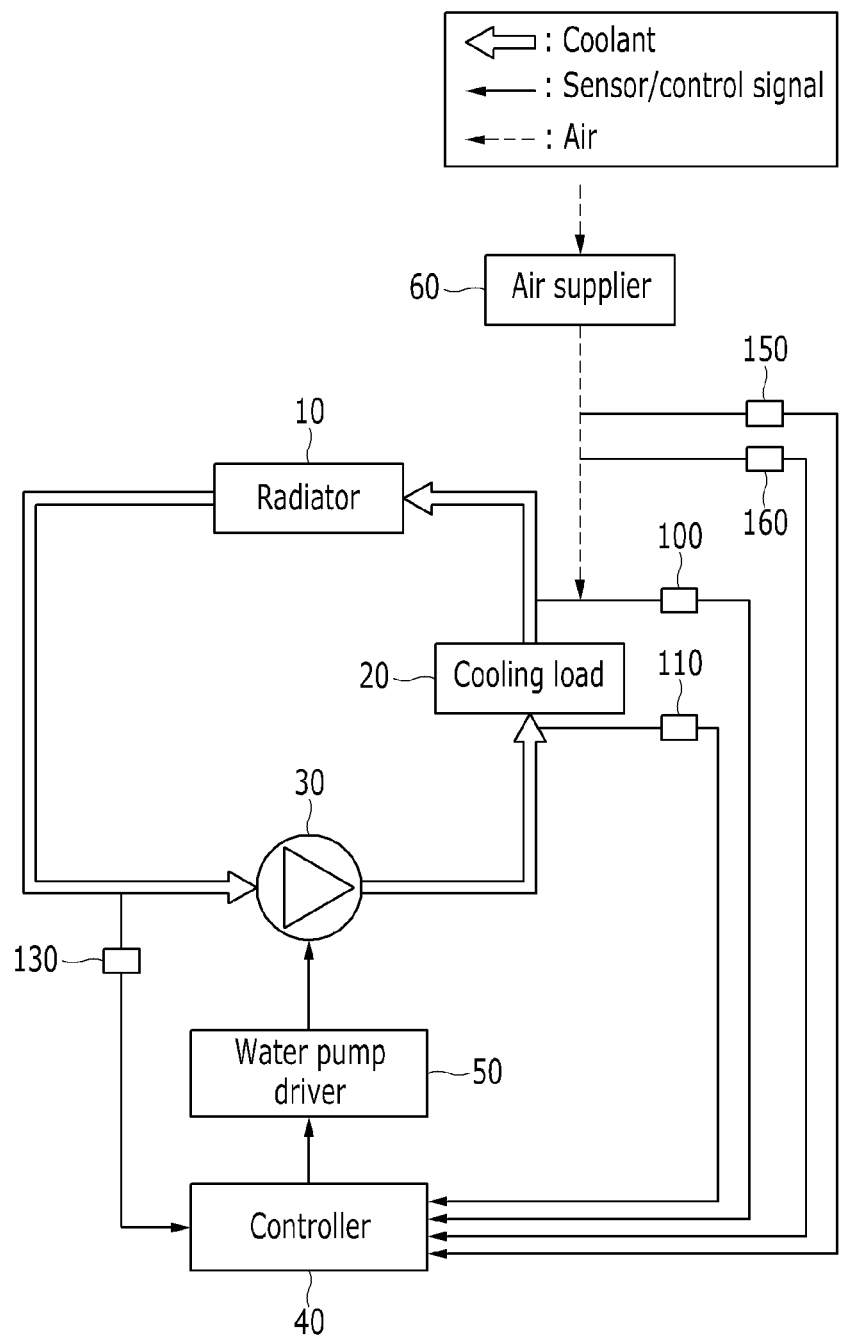
FIG. 6 is a block diagram illustrating a water pump system of a vehicle according to another exemplary embodiment of the present disclosure.

FIG. 6 is a block diagram illustrating a water pump system of a vehicle according to another exemplary embodiment of the present disclosure.

The same reference numerals will be used to refer to the same constituent elements throughout the exemplary embodiment and detailed description about the same elements will be omitted in order to avoid redundancy.

Referring to FIG. 6, a water pump system of a vehicle according to another exemplary embodiment of the present disclosure includes a radiator 10, a cooling load 20, a water pump 30, a controller 40, a water pump driver 50, an air supplier 60, a first temperature sensor 100, a second temperature sensor 110, a water pump temperature sensor 130, an air supplier pressure sensor 150, and an air supply side flow rate sensor 160.

Further, the controller 40 controls the water pump driver 50 to drive the water pump 30 based on signals received from the first temperature sensor 100, the second temperature sensor 110, the water pump temperature sensor 130, the air supplier pressure sensor 150, and the air supplier flow rate sensor 160.

As described above, according to an exemplary embodiment of the present disclosure, when a suction pressure of the water pump varies due to a variation in the atmospheric pressure and becomes less than a control reference pressure capable of creating cavitation, rotation speed of the water pump prevents the cavitation.

Moreover, the reduction in a flow rate of the coolant due to a reduction in the rotation speed of the water pump may be minimized by differently setting the control reference pressure capable of creating the cavitation according to a suction side temperature of the water pump. Accordingly, the cavitation generated when the vehicle runs at a high altitude can be prevented.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. A system for controlling a water pump of a vehicle moving a coolant circulating through a cooling load generating heat and a radiator discharging the heat to an outside, the system comprising:
   a first temperature sensor for detecting a temperature of a coolant exhausted from the cooling load;
   a second temperature sensor for detecting a temperature of the coolant to be supplied to the cooling load;
   an atmospheric pressure sensor for detecting an atmospheric pressure;
   a water pump driver for driving according to a rotation speed command; and
   a controller for controlling the water pump driver based on signals received from the first temperature sensor, the second temperature sensor, and the atmospheric pressure sensor, wherein
   the controller calculates the rotation speed command from a temperature difference between an input terminal and an output terminal of the cooling load, calculates a reference altitude based on the atmospheric pressure, sets a water pump suction pressure from a map with respect to the water pump suction pressure according to the rotation speed command in the reference altitude, and reduces the rotation speed command when the water pump suction pressure is less than a preset control reference pressure.

2. A system for controlling a water pump of a vehicle moving a coolant circulating through a cooling load generating heat and a radiator discharging the heat to an outside, the system comprising:
   a first temperature sensor for detecting a temperature of a coolant exhausted from the cooling load;
   a second temperature sensor for detecting a temperature of the coolant to be supplied to the cooling load;
   an air supplier pressure sensor for detecting an air pressure supplied from the air supplier;
   an air supplier flow rate sensor for detecting an air flow rate supplied from the air supplier;
   a water pump driver for driving the water pump according to a rotation speed command; and
   a controller for controlling the water pump driver based on signals received from the first temperature sensor, the second temperature sensor, the air supplier pressure sensor, and the air supplier flow rate sensor, wherein
   the controller calculates the rotation speed command from a temperature difference between an input terminal and an output terminal of the cooling load, calculates an atmospheric pressure based on the air pressure and the flow rate of the air, calculates a reference altitude based on the atmospheric pressure, sets a water pump suction pressure from a map with respect to the water pump suction pressure according to the rotation speed command in the reference altitude, and reduces the rotation speed command when the water pump suction pressure is less than a preset control reference pressure.

3. The system of claim 1, further comprising a water pump temperature sensor for detecting a water pump suction temperature, wherein the controller calculates a saturation vapor pressure in a suction side of the water pump based on the temperature in the water pump suction side and sets the control reference pressure according to the calculated saturation vapor pressure in the suction side of the water pump.

4. The system of claim 2, further comprising a water pump temperature sensor for detecting a water pump suction temperature, wherein the controller calculates a saturation vapor pressure in a suction side of the water pump based on the temperature in the water pump suction side and sets the control reference pressure according to the calculated saturation vapor pressure in the suction side of the water pump.

5. A method for controlling a water pump of a vehicle moving a coolant circulating through a cooling load generating heat and a radiator discharging the heat to an outside, the method comprising:
   calculating, by a controller, a rotation speed command based on a control reference temperature of the coolant;
   detecting, by the controller, an atmospheric pressure using an atmospheric pressure sensor;

calculating, by the controller, a reference altitude based on the detected atmospheric pressure;

setting, by the controller, a water pump suction pressure from a map with respect to the water pump suction pressure according to the rotation speed command in the calculated reference altitude; and comparing, by the controller, the set water pump suction pressure with a control reference pressure to control the rotation speed command, wherein the step of comparing the set water pump suction pressure includes:

reducing, by the controller, the rotation speed command if the set water pump suction pressure is less than the control reference pressure.

6. A method for controlling a water pump of a vehicle moving a coolant circulating through a cooling load generating heat and a radiator discharging the heat to an outside, the method comprising:

calculating, by a controller, a rotation speed command based on a control reference temperature of the coolant;

detecting, by the controller, an air pressure and an air flow rate supplied from an air supplier;

calculating, by the controller, an atmospheric pressure based on the detected air pressure and the air flow rate;

calculating, by the controller, a reference altitude based on the calculated atmospheric pressure;

setting, by the controller, a water pump suction pressure from a map with respect to the water pump suction pressure according to the rotation speed command in the calculated reference altitude; and comparing, by the controller, the set water pump suction pressure with a control reference pressure to control the rotation speed command, wherein the step of comparing the set water pump suction pressure include: reducing, by the controller, the rotation speed command if the set water pump suction pressure is less than the control reference pressure.

7. The method of claim 5, further comprising:

detecting, by the controller, a water pump suction temperature using a water pump temperature sensor; and calculating, by the controller, a saturation vapor pressure in a suction side of the water pump based on the detected water pump suction temperature, wherein the control reference pressure is set according to the calculated saturation vapor pressure in the suction side of the water pump.

8. The method of claim 5, further comprising detecting, by the controller, a temperature sensing value difference between an input terminal and an output terminal of the cooling load, wherein the control reference temperature is set as the detected temperature sensing value difference.

9. The method of claim 6, further comprising:

detecting, by the controller, a water pump suction temperature using a water pump temperature sensor; and calculating, by the controller, a saturation vapor pressure in a suction side of the water pump based on the detected water pump suction temperature, wherein the control reference pressure is set according to the calculated saturation vapor pressure in the suction side of the water pump.

10. The method of claim 6, further comprising detecting, by the controller, a temperature sensing value difference between an input terminal and an output terminal of the cooling load, wherein the control reference temperature is set as the detected temperature sensing value difference.

\* \* \* \* \*